(12) United States Patent
Kao et al.

(10) Patent No.: US 10,608,934 B2
(45) Date of Patent: Mar. 31, 2020

(54) BLOOM FILTER AND IMPLEMENTATION METHOD THEREOF

(71) Applicant: NATIONAL TAIWAN UNIVERSITY, Taipei (TW)

(72) Inventors: Sheng-Chun Kao, Taipei (TW); Ding-Yuan Lee, Taipei (TW); An-Yeu Wu, Taipei (TW); Ting-Sheng Chen, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 2 days.

(21) Appl. No.: 16/032,943

(22) Filed: Jul. 11, 2018

(65) Prior Publication Data

US 2019/0363984 A1    Nov. 28, 2019

(30) Foreign Application Priority Data

May 22, 2018  (TW) .............................. 107117424 A (51) Int. Cl.
*H04L 12/741*        (2013.01)
(52) U.S. Cl.
CPC ................................. *H04L 45/745* (2013.01)
(58) Field of Classification Search
None
See application file for complete search history.

(56) References Cited

U.S. PATENT DOCUMENTS

| 2010/0269024 A1* | 10/2010 | Hao ...................... H03M 13/13 |
| | | 714/777 |
| 2017/0046395 A1* | 2/2017 | Li ......................... G06F 3/0604 |
| 2017/0052731 A1* | 2/2017 | Levy ..................... G06F 16/285 |

OTHER PUBLICATIONS

Sheng-Chun Kao; Ding-Yuan Lee; Ting-Sheng; and An-Yeu Wu "Dynamically Updatable Ternary Segmented Aging Bloom Filter for OpenFlow-Compliant Low-Power Packet Processing" IEEE/ACM Transaction on Networking, vol. 26, No. 2, Apr. 2018 (Year: 2018).*

* cited by examiner

*Primary Examiner* — Mansour Oveissi
(74) *Attorney, Agent, or Firm* — Muncy, Geissler, Olds & Lowe, P.C.

(57) ABSTRACT

A bloom filter and an implementation method thereof are provided. The implementation method has a ternary rule encoded as a rule binary codeword according to a predetermined encoding rule; has a packet encoded as at least one packet binary codeword according to the predetermined encoding rule; and comparing the rule binary codeword and the at least one packet binary codeword to decide a following processing of the packet. The predetermined encoding rule includes: tagging 0 or 1 into most significant bit (MSB) of the output binary codeword based on mask length of the input codeword; placing the prefix of the input codeword right after MSB of the output binary codeword; and tagging a string to last bits of the output binary codeword based on the mask length, and the bit number of the string equals to the mask length.

10 Claims, 8 Drawing Sheets

BLOOM FILTER AND IMPLEMENTATION METHOD THEREOF

This application claims the benefit of Taiwan Patent Application Serial No. 107117424, filed May 22, 2018, the subject matter of which is incorporated herein by reference.

BACKGROUND OF INVENTION

1. Field of the Invention

The present invention is related to network technology, and more particularly is related to a Bloom Filter and an implementation method thereof.

2. Description of the Prior Art

Figure 1:
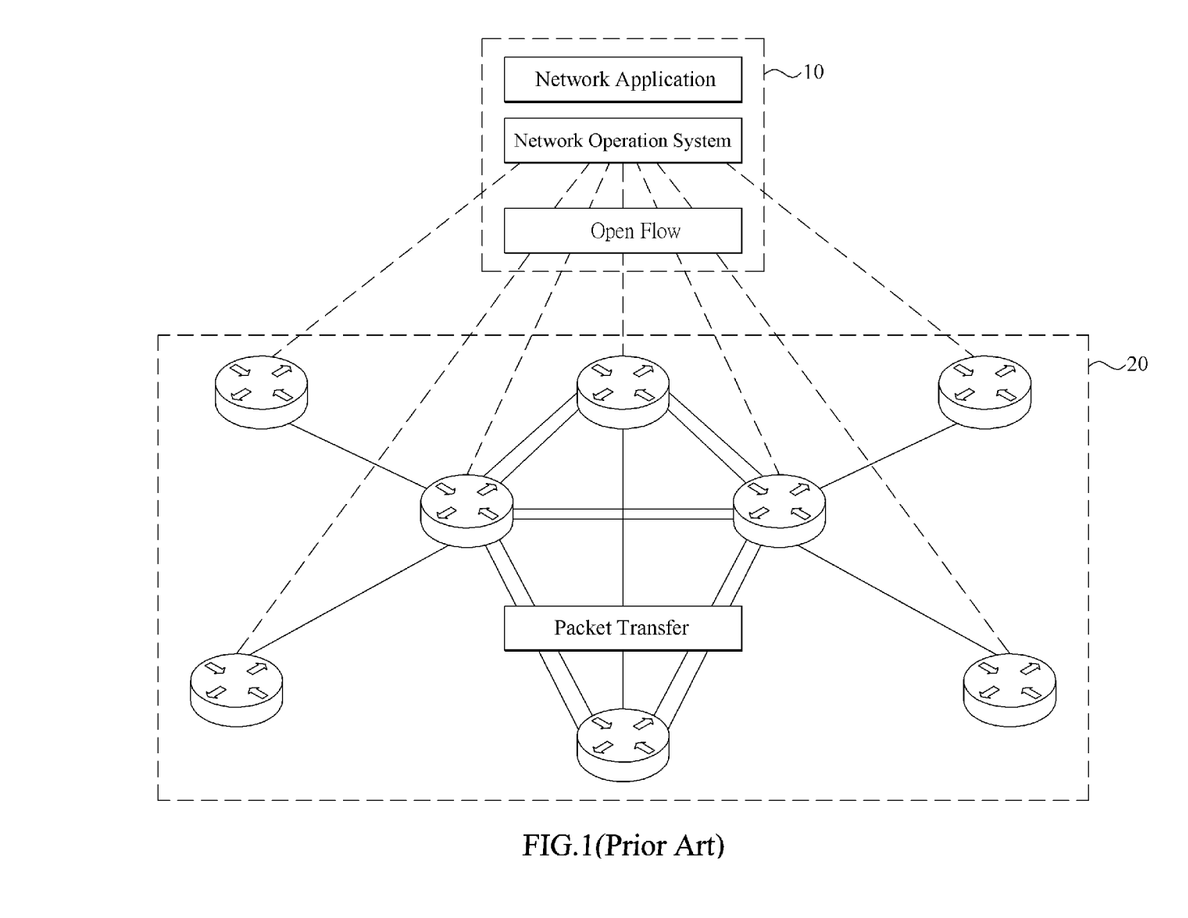
FIG. 1 is a schematic view of a conventional architecture of software defined networking.

FIG. 1 is a schematic view showing a conventional architecture of software defined networking (SDN). Software defined networking is a novel network architecture, which adopts OpenFlow protocol to separate the control plane 10 from the data plane 20 and uses software to implement the control plane 10. The control plane 10 includes the network applications and the operation system. The data plane 20 is the plane with actually forwards the traffic. This architecture enables the network manager to redesign the network by programs without the need to change the hardware apparatuses.

Figure 2:
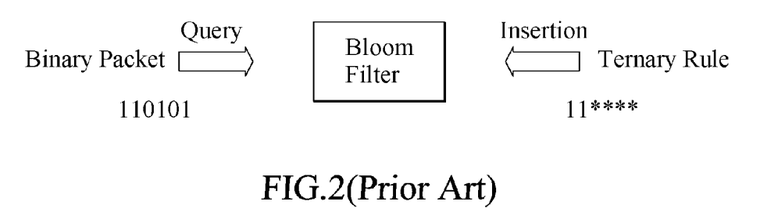
FIG. 2 is a schematic view showing the table-lookup operation executed by the conventional Bloom Filters.
Figure 3:
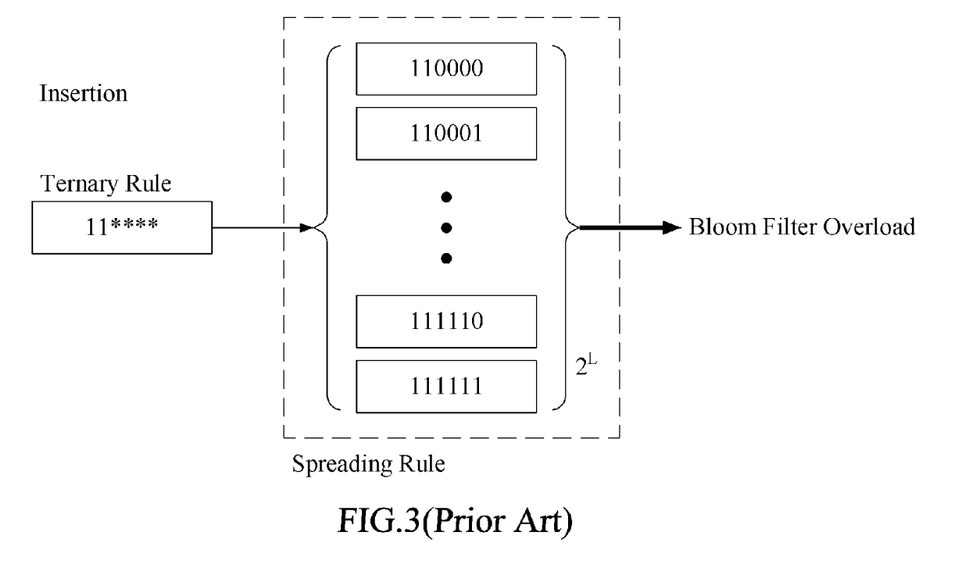
FIG. 3 is a schematic view showing the table-lookup operation with ternary rule parallelly spread into binary rules executed by the conventional Bloom Filters.

In order to achieve fast and parallel table-lookup, rule tables are often implemented with power hungry Ternary Content Addressable Memory (TCAM) in OpenFlow switches. However, power consumption of TCAM is usually the performance bottleneck of OpenFlow switches. To deal with this problem, many network applications had been proposed to employ Bloom Filters (BFs) to reduce redundant operations of table-lookup for the purpose of low power consumption. However, under the restriction of the characteristics of OpenFlow switches, as shown in FIGS. 2 and 3, the conventional Bloom Filters cannot deal with ternary rules directly. The ternary rule $\{11****\}$ needs to be parallelly spread into $2^L$ binary rules $\{110000, 110001 \ldots 111110, 111111\}$ before actually inserting into the Bloom Filters to do the table-lookup operation, wherein L is the maximum mask length of the ternary rule. The parallelly spreading operation would overload the Bloom Filters and occupy a great amount of storage space to result in storage crowded. Thus, it would be unfavorable to the employment of Bloom Filters in the OpenFlow switches. This problem also exists in the ordinary network switches.

SUMMARY OF THE INVENTION

Accordingly, it is a main object of the present invention to provide a Bloom Filter and an implementation method thereof to resolve the problems about dealing with ternary rules so as to provide a Bloom Filter suitable to the network switches.

An implementation method of a Bloom Filter is provided in the present invention. The Bloom Filter is adapted to a network switch. The implementation method comprises: encoding a ternary rule into a rule binary codeword according to a predetermined encoding rule; encoding a packet into at least one packet binary codeword according to the predetermined encoding rule; and comparing the rule binary codeword and the at least one packet binary codeword to determine following processing of the packet.

The aforementioned predetermined encoding rule comprises: tagging 0 or 1 into a most significant bit (MSB) of an output binary codeword based on a determination of whether a mask length of or in correspondence to an input codeword is zero or not; placing a prefix of the input codeword right after the MSB of the output binary codeword; and tagging a string to last bits of the output binary codeword based on the mask length, wherein a bit number of the string equals to the mask length. In this predetermined encoding rule, the input codeword is the ternary rule or the packet, and the output binary codeword is the rule binary codeword or the packet binary codeword.

In accordance with an embodiment of the implementation method, the string has a first bit of 1 followed by bits of 0.

In accordance with an embodiment of the implementation method, the step of encoding a packet into at least one packet binary codeword according to the predetermined encoding rule comprises providing at least one predetermined mask length in correspondence to the packet for generating the at least one packet binary codeword. In addition, as a preferred embodiment, the implementation method further comprising the step of estimating the prefix in correspondence to the packet to determine the at least one predetermined mask length in correspondence to the packet before the step of providing the at least one predetermined mask length in correspondence to the packet.

In accordance with an embodiment of the implementation method, the predetermined encoding rule is decodable.

A Bloom Filter is also provided in the present invention. The Bloom Filter is adapted to a network switch. The Bloom Filter comprises a rule processing unit, a packet processing unit, and a Bloom Filter unit. The rule processing unit is utilized for encoding a ternary rule into a rule binary codeword according to a predetermined encoding rule. The packet processing unit is utilized for encoding a packet into at least one packet binary codeword according to the predetermined encoding rule. The Bloom Filter unit is utilized for comparing the rule binary codeword and the at least one packet binary codeword to determine following processing of the packet.

The aforementioned predetermined encoding rule comprises: tagging 0 or 1 into a most significant bit (MSB) of an output binary codeword based on a determination of whether a mask length of or in correspondence to an input codeword is zero or not; placing a prefix of the input codeword right after the MSB of the output binary codeword; and tagging a string to last bits of the output binary codeword based on the mask length, wherein a bit number of the string equals to the mask length. In this predetermined encoding rule, the input codeword is the ternary rule or the packet, and the output binary codeword is the rule binary codeword or the packet binary codeword.

In accordance with an embodiment of the Bloom Filter, the string has a first bit of 1 followed by bits of 0

In accordance with an embodiment of the Bloom Filter, the packet processing unit encoding the packet into the at least one packet binary codeword by using at least one predetermined packet length in correspondence to the packet. As a preferred embodiment, the packet processing unit comprises a prefix predict unit, for estimating the prefix in correspondence to the packet to determine the at least one predetermined mask length in correspondence to the packet before the step of providing the at least one predetermined mask length in correspondence to the packet.

In accordance with an embodiment of the Bloom Filter, the predetermined encoding rule is decodable.

By using the Bloom Filter and the implementation method thereof provided in the embodiments of the present invention, the ternary rule and the binary packet can be encoded into the decodable binary codeword by using the same encoding logic, such that the difficulty about dealing ternary content can be prevented so as to facilitate the application of Bloom Filters to the network switches.

The present invention will be specified with reference to the following embodiments and the drawings.

DESCRIPTION OF THE PREFERRED EMBODIMENT

Figure 4:
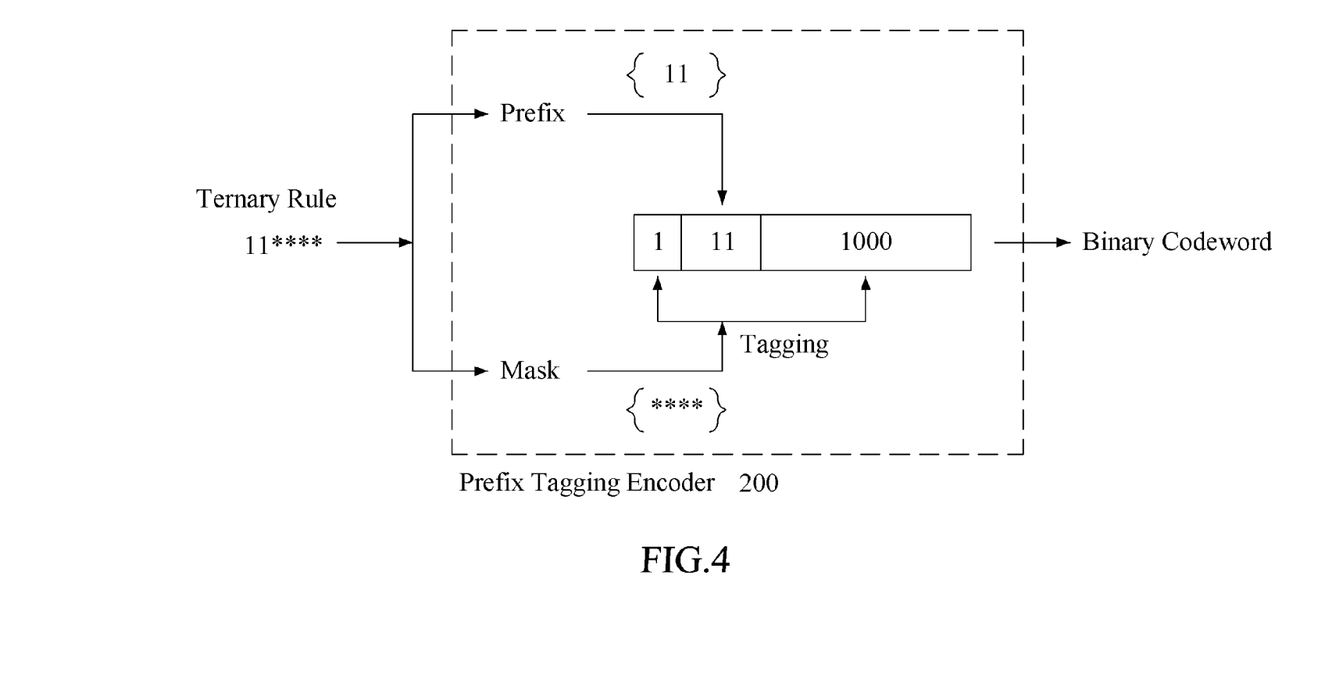
FIG. 4 is a schematic view of a preferred embodiment of a ternary prefix-tagging encoder provided in the present invention.

FIG. 4 is a schematic view of a preferred embodiment of a ternary prefix-tagging encoder provided in the present invention. The ternary prefix-tagging encoder 200 is utilized for encoding an input codeword into a unique output binary codeword, and the output binary codeword can be decoded to obtain the original input codeword. Thereby, the problem of element collision can be prevented when generating the encoded codewords to contribute the operations of table-lookup executed by the Bloom Filters based on the encoded binary codeword.

The following paragraphs using the ternary rule common to the OpenFlow switches as the input codeword as an example to explain the ternary prefix-tagging encoder 200 provided in the present invention. It is noted that the ternary prefix-tagging encoder 200 not only is capable to encode the ternary rule into a unique decodable rule binary codeword but also is capable to encode the binary packet into an decodable packet binary codeword to enhance the comparison between the packet and the rule.

General speaking, the ternary rule common to the lookup operation of the router includes a prefix and a mask. Take the ternary rule {11**} as an example, the prefix is {11} of the codeword, and the mask is {**} of the codeword. However, in some specific conditions, such as exact-matched rule, the mask length would be zero and no mask exists in the ternary rule.

The encoding process of the ternary prefix-tagging encoder 200 is mentioned below. Firstly, the prefix and the mask length of the ternary rule is determined. Take the ternary rule {11*****} provided in the present embodiment as an example, the prefix is {11} of the codeword and the mask length is four bits.

Based on the mask length, it is capable to determine whether the ternary rule is the exact-matched rule. If the mask length is 0, which represents that the ternary rule is the exact-matched rule, a binary zero would be tagged into the most significant bit (MSB) of the rule binary codeword. On the contrary, if the mask length is greater than 0, which represents that the ternary rule is not the exact-matched rule, a binary one would be tagged into the MSB of the rule binary codeword. Take the ternary rule {11****} provided in the present embodiment as an example, the mask length is four bits, and thus the binary one should be tagged into the MSB of the rule binary codeword.

In addition, the prefix of the ternary rule, e.g. {11} of the codeword, is placed in the rule binary codeword right after the MSB. Moreover, a string is tagged to the last bits of the rule binary codeword based on the mask length, wherein the bit number of the string equals to the mask length. For example, the mask of the provided ternary rule is {****}, which has a mask length of four bits, thus, the string to be tagged to the rule binary codeword has a length of four bits. As a preferred embodiment, in order to prevent element collision, the string has a first bit of 1 followed by bits of 0.

Take the ternary rule provided in the present embodiment as an example, the mask length is four bits, and thus the string to be tagged to the last bits of the rule binary codeword during the encoding process would be {1000}. By using the aforementioned encoding process, the original ternary rule {11****} can be encoded as a unique decodable rule binary codeword {1111000}.

If the provided ternary rule is {110000}, which represents the exact-matched rule, the mask length would be zero. Then, a binary zero would be tagged into the MSB of the rule binary codeword, the prefix of the ternary rule would be {110000}, and the length of the string to be tagged to the last bits of the rule binary codeword is zero, i.e. no string would be placed after the prefix. Thus, the generated rule binary codeword would be {0110000}.

The aforementioned encoding process tags the binary zero into the MSB of the rule binary codeword as the mask length is zero and tags the binary one into the MSB of the rule binary codeword as the mask length is greater than zero. However, the present invention is not so restricted. In accordance with another embodiment of the present invention, a binary one may be tagged into the MSB of the rule binary codeword as the mask length is zero and a binary zero may be tagged into the MSB of the rule binary codeword as the mask length is greater than zero.

In should be noted that the sequence of encoding process mentioned above is for description purpose rather than restricting the progress of the encoding process. In practice, the steps described in the encoding process may be executed simultaneously or in different order.

By using the aforementioned encoding process, each of the ternary rules can be encoded into a unique decodable rule binary codeword, and similarly, the packet can be encoded into the corresponding packet binary codeword to facilitate the lookup operation. Thereby, the problem that the Bloom Filter cannot deal with ternary content directly can be effectively resolved.

Figure 5:
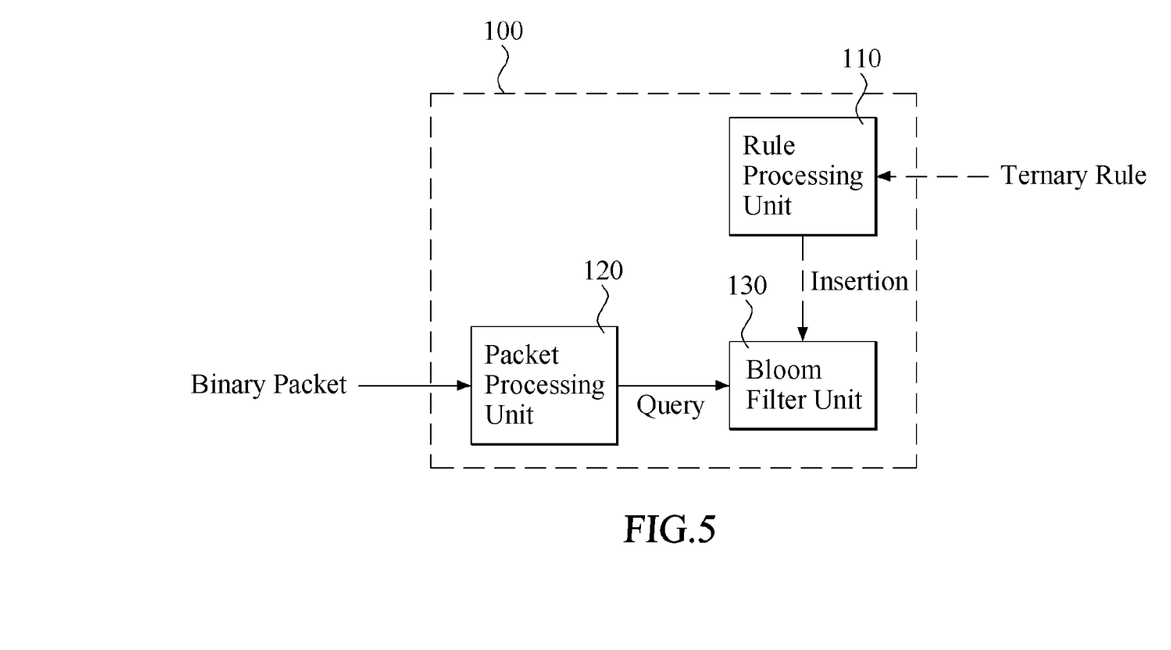
FIG. 5 is a schematic view of a preferred embodiment of a Bloom Filter provided in the present invention.

FIG. 5 is a schematic view of a preferred embodiment of a Bloom Filter provided in the present invention. The Bloom Filter 100 is adapted to a network switch, especially the OpenFlow switch. As shown, the Bloom Filter 100 includes a rule processing unit 110, a packet processing unit 120, and a Bloom Filter unit 130. The Bloom Filter 100 can be implemented by hardware or software.

The rule processing unit 110 includes the ternary prefix-tagging encoder 200 shown in FIG. 4 for encoding a ternary rule into a rule binary codeword according to a predetermined encoding rule.

The packet processing unit 120 also includes the ternary prefix-tagging encoder 200 shown in FIG. 4 for encoding a packet into at least one packet binary codeword according to the predetermined encoding rule.

The Bloom Filter unit 130 is utilized for comparing the aforementioned rule binary codeword and the packet binary codewords to decide the following operation of the packet.

The aforementioned predetermined encoding rule comprises the steps of: tagging binary zero into the MSB of the output binary codeword if the mask length of or corresponding to the input binary codeword is zero, and tagging binary one into the MSB of the output binary codeword if the mask length of or corresponding to the input binary codeword is greater than zero; placing the prefix of the input codeword right after the MSB of the output binary codeword; and tagging a string to last bits of the output binary codeword based on the mask length, wherein a bit number of the string equals to the mask length. As a preferred embodiment, the string has a first bit of 1 followed by bits of 0.

Figure 6A:
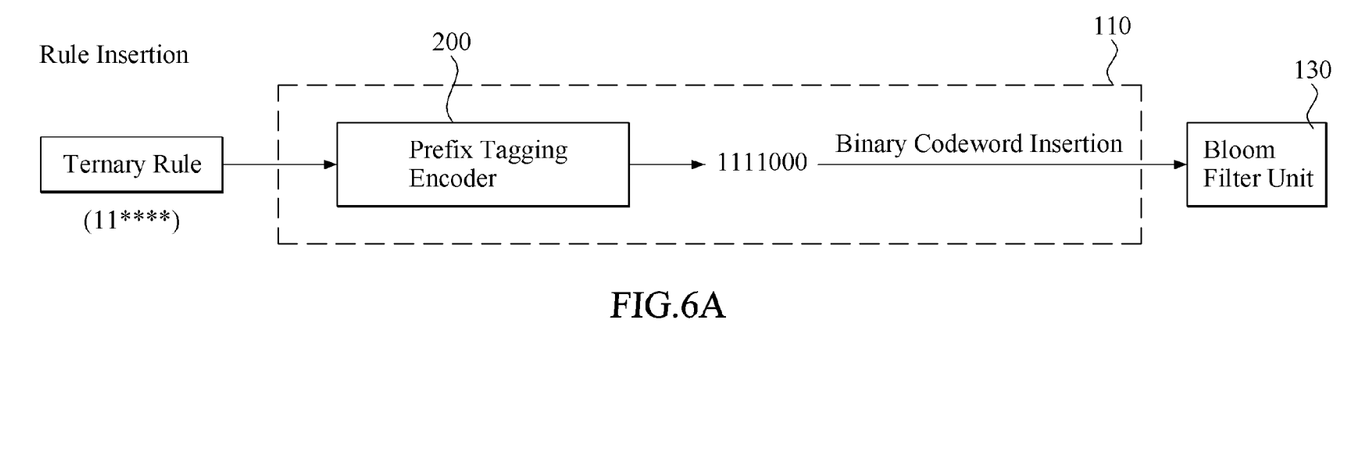
FIG. 6A is a schematic view showing a preferred embodiment of the operation of ternary rule insertion executed by the rule processing unit of FIG. 5.

FIG. 6A is a schematic view showing a preferred embodiment of the operation of ternary rule insertion executed by the rule processing unit 110 of FIG. 5. As shown, the ternary prefix-tagging encoder 200 receives the inserted ternary rule, i.e. {11****}, and encodes the ternary rule into a unique binary codeword, i.e. {1111000}, provided to the Bloom Filter unit 130. The detail of the encoding operation can be referred to FIG. 4 and the corresponding paragraphs.

The paragraphs corresponding to FIG. 4 describe the process of encoding the ternary rule into the rule binary codeword by using the ternary prefix-tagging encoder 200. The encoding process is also capable to encode the binary packet into the corresponding packet binary codeword as shown in FIG. 6B.

Figure 6B:
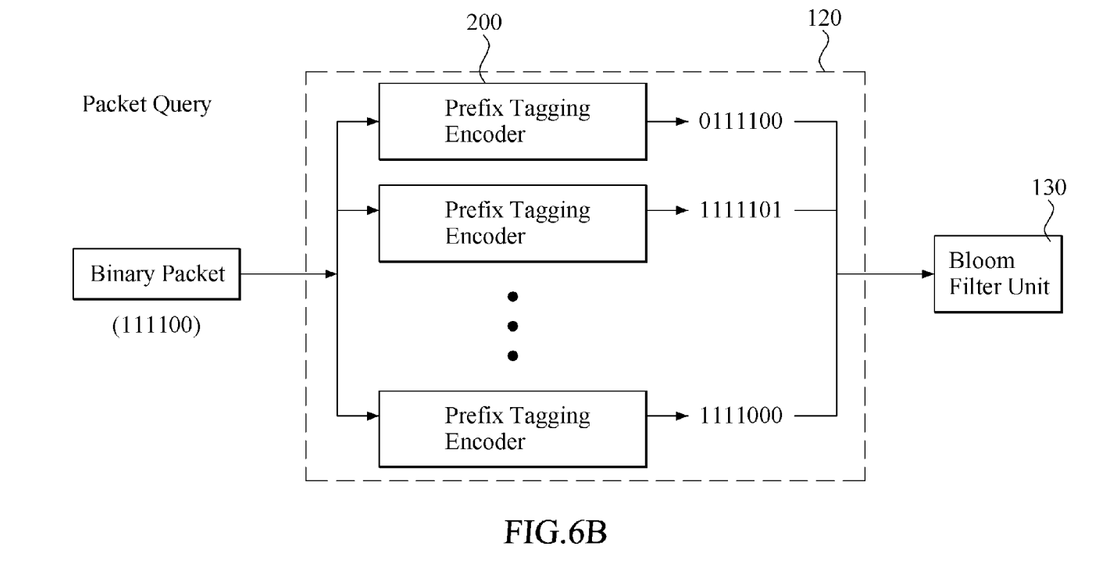
FIG. 6B is a schematic view showing a preferred embodiment of the operation of query executed by the packet processing unit of FIG. 5.

FIG. 6B is a schematic view showing a preferred embodiment of the operation of query executed by the packet processing unit 120 of FIG. 5. Different from the ternary rule, which has a given prefix and a given mask, when using the encoding process of FIG. 4 to encode a binary packet, it is necessary to determine the corresponding mask length first.

For a given binary packet, multiple output binary codewords would be generated by changing the corresponding mask length, and the number of the possible output binary codewords equals to the bit number of the binary packet.

Concretely speaking, the encoding process of the ternary prefix-tagging encoder 200 for the binary packet is mentioned below.

Firstly, a predetermined mask length is provided. The bits of the binary packet before the mask with the mask length are the prefix.

If the predetermined mask length is zero, a binary zero would be tagged into the MSB of the corresponding packet binary codeword, and if the predetermined mask length is greater than zero, a binary one would be tagged into the MSB of the corresponding binary codeword.

In addition, the prefix of the binary packet is placed in the packet binary codeword right after the MSB. Moreover, a string is tagged to the last bits of the packet binary codeword based on the mask length, wherein the bit number of the string equals to the mask length. As a preferred embodiment, the string has a first bit of 1 followed by bits of 0.

For example, if the packet is {111100} and the predetermined mask length is four bits, the prefix would be {11}. Since the mask length is four bits, the string to be tagged to the last bits of the corresponding packet binary codeword would be {1000}. Thus, for the packet {111100}, the corresponding packet binary codeword would be {1111000} as the mask length is four bits.

For the same packet {111100}, if the mask length is one bit, the prefix would be {11110}, and a binary one would be tagged into the MSB of the corresponding packet binary codeword because the mask length is greater than zero. In addition, since the mask length is one bit, the string to be tagged to the last bits of the packet binary codeword would be {1}. Thus, for the packet {111100}, the corresponding packet binary codeword would be {1111101} as the mask length is one bit.

For the same packet {111100}, if the mask length is zero, the prefix would be {111100}, and a binary zero would be tagged into the MSB of the corresponding packet binary codeword because the mask length is zero. In addition, it is unnecessary to tag an additional sting to the last bits of the packet binary codeword. Thus, for the packet {111100}, the corresponding packet binary codeword would be {0111100} as the mask length is zero.

Figure 7:
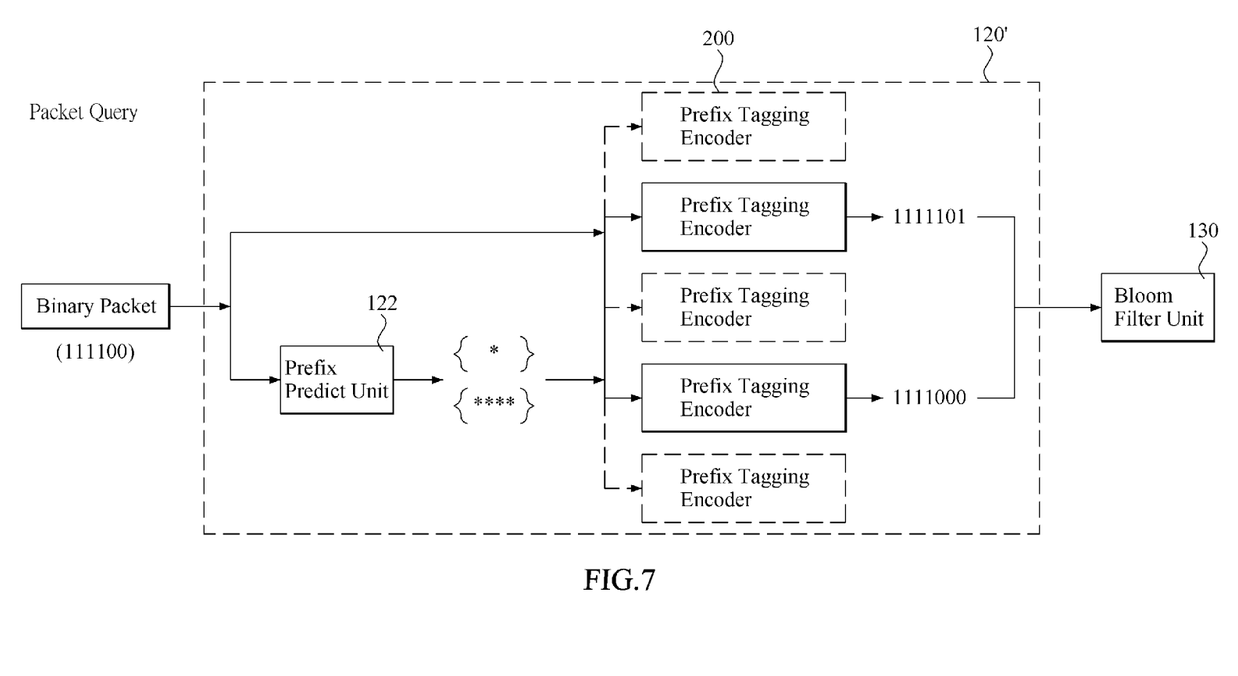
FIG. 7 is a schematic view of another preferred embodiment of the packet processing unit in FIG. 5.

FIG. 7 is a schematic view of another preferred embodiment of the packet processing unit in FIG. 5. As shown, different from the packet processing unit 120 in the embodiment of FIG. 6B, the packet processing unit 120' in the present embodiment includes a prefix predict unit 122 in addition to the ternary prefix-tagging encoder 200. The prefix predict unit 122 is utilized for predicting the prefix corresponding to the packet to determine the possible mask lengths and exclude those with low possibility. Thereby, some certain encoding processes can be skipped to reduce the overall lookup time. The details of the operation of the prefix predict unit 122 would be described in the following paragraphs.

According to the prediction of the prefix predict unit 122, the packet processing unit 120' only needs to generate the rule binary codewords with respective to the predicted mask length(s) for the Bloom Filter unit 130 rather than all the possible rule binary codewords. For example, as shown in the figure, if the prefix predict unit 122 makes the prediction that the mask length is four bits and one bit, the packet processing unit 120' only needs to generate the corresponding packet binary codewords under the conditions that the mask length is four bits and one bits, i.e. the binary codewords {1111101} and {1111000}, for the following lookup operation.

Figure 8:
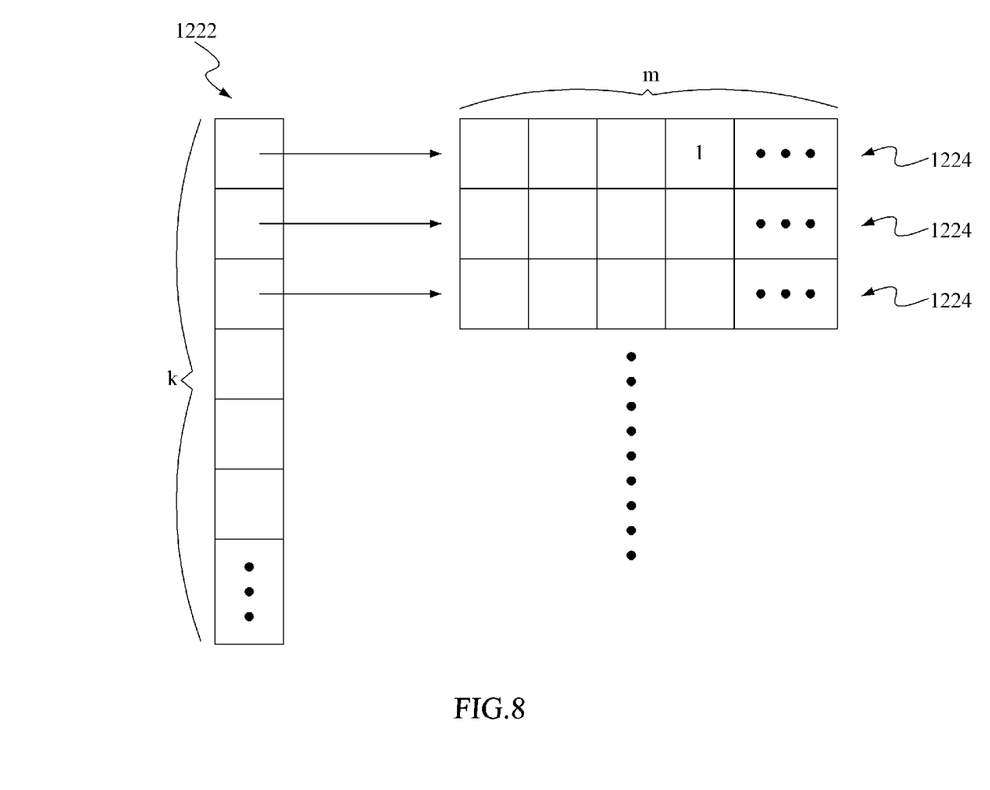
FIG. 8 is a schematic view of a preferred embodiment of a prefix predict unit in FIG. 7.

FIG. 8 is a schematic view of a preferred embodiment of the prefix predict unit 122 in FIG. 7. As shown, the prefix predict unit 122 includes a Bloom Filter pointer array 1222 and a corresponding storage array 1224, and the operation thereof includes a BF insertion step and a BF query step.

In the BF insertion step, firstly, the received binary packet is encoded as a ternary rule to access the lookup information with a certain bit length (e.g. information of the first eight bits) and the mask length. In one embodiment, the length k of the Bloom Filter pointer array 1222 is corresponding to the lookup information. The column number of the storage array 1224 is corresponding to the length k of the Bloom Filter pointer array 1222, and the bit number in of each column is corresponding to the possible mask length.

Then, a specific location of the storage array is identified and labelled one by using the lookup information and the mask length. In one embodiment, the lookup information is utilized for deciding the location of the corresponding column in the storage array, and the mask length is utilized for deciding the location of a specific bit in the corresponding column. For example, if the mask length is four bits, the fourth bit of the corresponding column would be labelled one. By using the aforementioned process, the BF insertion process can be accomplished.

In the BF query step, firstly, the received binary packet is analyzed to figure out the prefix information with a certain bit length (e.g. information of the first eight bits). Afterward, the prefix information is used to find out the location of the corresponding column in the storage array, and then the bits labelled one in this column are determined. The location of the bits labelled one in the column represents the possible mask length, and such information would be provided as the prediction of the prefix predict unit 122.

By using the Bloom Filter and the implementation method thereof provided in the embodiments of the present invention, the ternary rule and the binary packet can be encoded into the decodable binary codeword by using the same encoding logic, such that the difficulty about dealing ternary content can be prevented to facilitate the application of Bloom Filters to the network switches.

While the present invention has been particularly shown and described with reference to a preferred embodiment, it will be understood by those skilled in the art that various changes in form and detail may be without departing from the spirit and scope of the present invention.

What is claimed is:

1. An implementation method of a Bloom Filter for a network switch, and the implementation method comprising:
   encoding a ternary rule into a rule binary codeword according to a predetermined encoding rule;
   encoding a packet into at least one packet binary codeword according to the predetermined encoding rule; and
   comparing the rule binary codeword and the at least one packet binary codeword to determine a processing to the packet by the network switch;
   wherein the predetermined encoding rule comprising:
      tagging 0 or 1 into a most significant bit (MSB) of an output binary codeword based on a determination of whether a mask of an input codeword exists or not;
      placing a prefix of the input codeword right after the MSB of the output binary codeword; and
      tagging a string to the output binary codeword after the prefix placed in the output binary codeword based on a mask length of the mask, wherein a bit number of the string equals to the mask length of the mask;
   wherein the input codeword is the ternary rule or the packet, and the output binary codeword is the rule binary codeword or the packet binary codeword;
   wherein the input codeword is composed of a prefix and a mask.

2. The implementation method of claim 1, wherein the string has a first bit of 1 followed by bits of 0.

3. The implementation method of claim 1, wherein the step of encoding a packet into at least one packet binary codeword according to the predetermined encoding rule comprises providing at least one predetermined mask length in correspondence to the packet for generating the at least one packet binary codeword.

4. The implementation method of claim 3, further comprising the step of estimating the prefix in correspondence to the packet to determine the at least one predetermined mask length in correspondence to the packet before the step of providing the at least one predetermined mask length in correspondence to the packet.

5. The implementation method of claim 1, wherein the predetermined encoding rule is decodable.

6. A Bloom Filter for a network switch, comprising:
   a rule processing unit, for encoding a ternary rule into a rule binary codeword according to a predetermined encoding rule;
   a packet processing unit, for encoding a packet into at least one packet binary codeword according to the predetermined encoding rule; and
   a Bloom Filter unit, for comparing the rule binary codeword and the at least one packet binary codeword to determine a processing to the packet by the network switch;
   wherein the predetermined encoding rule comprising:
      tagging 0 or 1 into a most significant bit (MSB) of an output binary codeword based on a determination of whether a mask of an input codeword exists or not;
      placing a prefix of the input codeword right after the MSB of the output binary codeword; and
      tagging a string to the output binary codeword after the prefix placed in the output binary codeword based on a mask length of the mask, wherein a bit number of the string equals to the mask length of the mask;
   wherein the input codeword is the ternary rule or the packet, and the output binary codeword is the rule binary codeword or the packet binary codeword;
   wherein the input codeword is composed of a prefix and a mask.

7. The Bloom Filter of claim 6, wherein the string has a first bit of 1 followed by bits of 0.

8. The Bloom Filter of claim 6, wherein the packet processing unit encoding the packet into the at least one packet binary codeword by using at least one predetermined packet length in correspondence to the packet.

9. The Bloom Filter of claim 8, wherein the packet processing unit comprises a prefix predict unit, for estimating the prefix in correspondence to the packet to determine the at least one predetermined mask length in correspondence to the packet before the step of providing the at least one predetermined mask length in correspondence to the packet.

10. The Bloom Filter of claim 6, wherein predetermined encoding rule is decodable.

* * * * *